Jan. 29, 1963 J. LELIS 3,075,381
TESTING STAND
Filed Dec. 14, 1959 5 Sheets-Sheet 1

INVENTOR.
JOHN LELIS,
BY M. Ralph Shaffer
HIS ATTORNEY

Jan. 29, 1963 J. LELIS 3,075,381
TESTING STAND
Filed Dec. 14, 1959 5 Sheets-Sheet 2

INVENTOR.
JOHN LELIS
BY
HIS ATTORNEY

Jan. 29, 1963 J. LELIS 3,075,381
TESTING STAND
Filed Dec. 14, 1959 5 Sheets-Sheet 4

INVENTOR.
JOHN LELIS
BY M. Ralph Shaffer
HIS ATTORNEY

Jan. 29, 1963  J. LELIS  3,075,381
TESTING STAND
Filed Dec. 14, 1959  5 Sheets-Sheet 5

INVENTOR
JOHN LELIS
BY
HIS ATTORNEY

3,075,381
TESTING STAND
John Lelis, Bountiful, Utah
Filed Dec. 14, 1959, Ser. No. 859,404
23 Claims. (Cl. 73—118)

This invention relates to a testing stand for locking the stator (housing) of a machine in securement while selectively driving the rotor of the machine so as to perform certain tests in connection with the machine and, more particularly, provides a testing stand adapted to accommodate the securement and driving of any one of a number of automatic transmissions of the automotive type, so that these transmissions may be subjected to a variety of tests under simulated driving conditions.

An object of the present invention is to provide a testing stand type machine which, with a minimum of components, is adapted to mount and drive any one of a great number of types and sizes of transmissions, for testing purposes.

A further object of the present invention is to provide a blade mechanism which, by virtue of the selectable inclusion of one of a number of adapter plates and centering rings, may be used to mount the fixed housings of any one of a number of transmissions thereto.

It is an additional object to make the distance between the aforementioned blade and the input drive or drive line adjustable as, for example, by making the blade adjustable in position, relative to the power plant of the testing stand, so that automatic transmissions having bell housings (and their own fluid converters contained therewithin) may be easily tested without removing the fluid converter and bell housing of the transmission.

An additional object is to provide a reworked fluid converter for the testing machine which is adapted to couple the work-end of the crank shaft of the power plant to the input end of a transmission to be tested in a very much simplified manner.

An additional object of the present invention is to devise a drive plate to be used in lieu of the aforementioned fluid converter for connection to any one of a number of transmission rotors of the self-contained, fluid converter type.

An additional object is to provide centering means for centering bell-housing type transmission when the same were mounted through the aforementioned drive plate.

An additional object of the invention is to provide eccentric lock means for the tail stock and the blade mechanism of the stand, so that the tail stock and blade may be locked in place.

An additional object is to supply means for preventing the occurrence of any tendencies which would tend to put the equipment out of alignment, either due to the setting of the eccentric lock of the blade mechanism or because of the clockwise torque imposed upon the blade mechanism when a transmission is attached thereto.

An additional object of the invention is to provide means for adjusting the tail stock (including a heavy fly wheel on the order of 1100 lbs.) so that movement thereof may be accomplished easily.

According to the present invention, the test stand includes a heavy steel frame which is adapted for bolting to a cement floor. To one end of this frame is securely attached as by means of welding, bolts or other means a power plant (such as a marine engine utilizing a rubber impeller marine pump and a protective device known as the "Gray Marine Thermoguard"). A pair of self-aligning bearings are mounted on both sides of the frame, in the region of the power plant, and each respective pair journals a respective slide rod. A blade structure in one embodiment is rigidly affixed to this slide rod and a wheel crank, screw, and fixed nut mechanism serve in the structure to move the blade mechanism toward and away from the power plant. Hardened steel bars are disposed on both sides of the frame and in the region of the blade, and the blade has a pair of steel pads at each side to just contact these bars. The bars may be aligned with each other and the blade so that the setting of the eccentric lock of the blade mechanism and, further, the loading of the blade (by mounting the transmission thereto) will not cause a "sag" either way in the blade such as to contribute to misalignment with respect to the drive shaft of the power plant. The tail stock of the machine, slidably mounted on the I-beams of the frame, is advanceable toward and away from a blade mechanism, and includes a heavy fly wheel (of the order of 1100 to 1500 pounds) mounted upon a shaft and provided with an air brake system. The frame is supplied with an air brake foot pedal so that the motion imparted to the fly wheel (the latter simulating automobile load) from the power plant through the transmission thereto may be easily braked.

The brake drums are bolted to the fly wheel, and the latter draws the heat generated in the former and dissipates the same, thus operating as a high capacity, heat sink and also a large surfaced radiator. The tail stock itself is adjustable in position by virtue of a chain drive, the latter comprising a chain length looping a pair of sprockets and connecting at their ends to the lateral, horizontal, center of gravity axis of the tail stock. Thus, binding of the tail stock on its guide blade (an inverted T-beam) is avoided since the T-beam also lies centrally of the tail stock. The wheel crank driving the tail stock is appropriately geared, by virtue of the sprocket size, to the tail stock, and the shaft connected to the wheel crank is journalled in self-aligning bearings so that the slight bowing of the shaft under the weight of the fly wheel will not produce binding to otherwise interfere with the adjustment of the position of the tail stock of the equipment.

The tail stock is supplied with a novel eccentric lock which is easily engaged and disengaged by the operator.

In practice, the operator notes the type of transmission to be tested and then selects the appropriate adapter plate and centering ring (if called for), bolting the latter two to the housing of the transmission. Dowel pins are used in shear to preclude any further tendencies of the housing to rotate and also to position the housing on center-line of the adapter plate, the pins being inserted in the appropriate, aligned holes in the housing and in the adapter plate. The adapter plate is inserted in the blade mechanism (previously aligned) and tightened in place by means of hardened steel C-clamps. The fluid adapter or drive plate (depending upon the type of transmission being tested) is connected to the rotor of the transmission and, by movement of the blade mechanism, comes into engagement with the drive shaft end of the power plant. At this point the tail stock is moved upwardly so that its universal spline connection engages the aft end of the transmission. Means are provided underneath the aft end of the transmission housing to take up some of the stress which would otherwise be imposed upon the blade by transmission weight. Upon completion of the tail stock hook-up to the transmission (hereinafter described in detail together with the adapters employed thereby), the tail stock is locked by its eccentric lock and the machine is ready for operation. The auxiliary series of gauges to be used for actual test purposes, the oil supply and pressure gauges associated therewith are all omitted from the drawing and form no part of the invention.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 6A (1) is an enlarged view taken along the line 6A—6A in FIGURE 6 and illustrates in fragmentary view the eccentric lock of a tail stock when the same is in "lock" position.

FIGURE 6A (2) is an enlarged fragmentary view taken along the line 6A—6A in FIGURE 6 and illustrates the eccentric lock of the tail stock when the same is in "unlock" position.

FIGURE 8 is a view taken along the line 8—8 in FIGURE 7 and illustrates in elevation the "blade" unit of the stand.

FIGURE 8A (1) is an enlarged detail taken along the arcuate line 8A—8A in FIGURE 8 and illustrates the condition when the blade unit is in its unlocked condition.

FIGURE 8A (2) is an enlarged detail taken along the line 8A—8A in FIGURE 8 and illustrates in fragmentary view the blade unit when the same is locked in position.

FIGURE 9 is an enlarged fragmentary section taken along the line 9—9 in FIGURE 8 and illustrates a representative attachment of a selected adapter plate to the steel ring of the blade.

FIGURE 10 is a fragmentary view, partially in cross-section, and taken along the line 10—10 in FIGURE 8, and illustrates the manner in which a representative adapter plate is clamped in position to the steel ring of the blade.

FIGURE 11 is a cut-away, partially-sectioned edge view of the selected adapter plate shown mounted in the equipment in FIGURE 8.

FIGURE 12 is a fragmentary, partially-sectioned edge view of the selected adapter ring which is mounted in its associated adapter plate in the blade structure shown in FIGURE 8.

FIGURES 13 and 14 are plan and fragmentary edge views, respectively, of a second adapter ring which may be used in the plate shown in FIGURE 8.

FIGURES 15 and 16 are plan and fragmentary edge views, respectively, of an additional adapter ring which may be used in the plate shown clamped in position in FIGURE 8.

FIGURES 17 and 18 are plan and fragmentary edge views, respectively, of still another adapter ring used in the plate clamped in position in FIGURE 8.

FIGURES 19 and 20 are plan and cut-away edge views, respectively, of a substitute adapter plate for insertion in the equipment shown in FIGURE 8 in lieu of the adapter plate and ring therein shown.

FIGURES 21 and 22 are plan and edge views of a third adapter plate which may be used in the blade mechanism shown in FIGURE 8.

FIGURE 23 is a fragmentary section taken along the line 23—23 in FIGURE 21.

FIGURE 24 is a plan of the reverse side of the adapter plate shown in FIGURE 21.

FIGURE 25 is a fragmentary section taken along the line 25—25 in FIGURE 24.

FIGURE 26 is a plan view of still another adapter plate which may be used in the structure shown in FIGURE 8.

FIGURES 28 and 29 are plan and cut-away edge views, respectively, of a sealing plug to be bolted to the aft end of a "Power Glide" type transmission.

FIGURES 30 and 31 are plan and edge cut-away views, respectively, of a sealing plug to be bolted to a "Buick" type of transmission when the same is to be tested on the machine of the subject invention.

Figures 1, 1A:
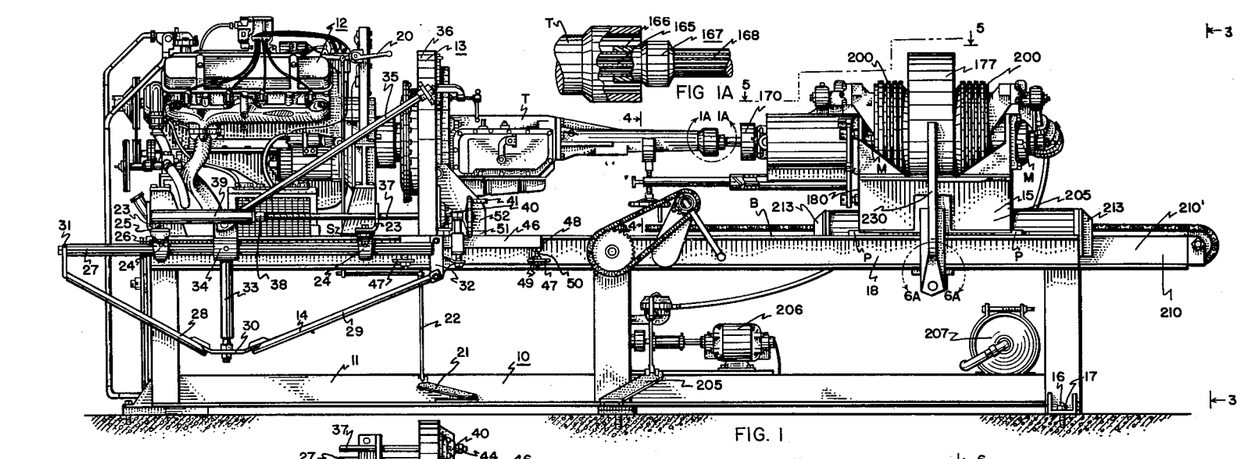
FIGURE 1 is an elevation of the testing stand of the present invention when the same contains an automotive, automatic transmission to be tested.
FIGURE 1A is an enlarged, fragmentary detail taken along the line 1A—1A in FIGURE 1 and illustrates one adapter which may be employed to connect the transmission to the tail stock of the testing stand.
Figure 2:
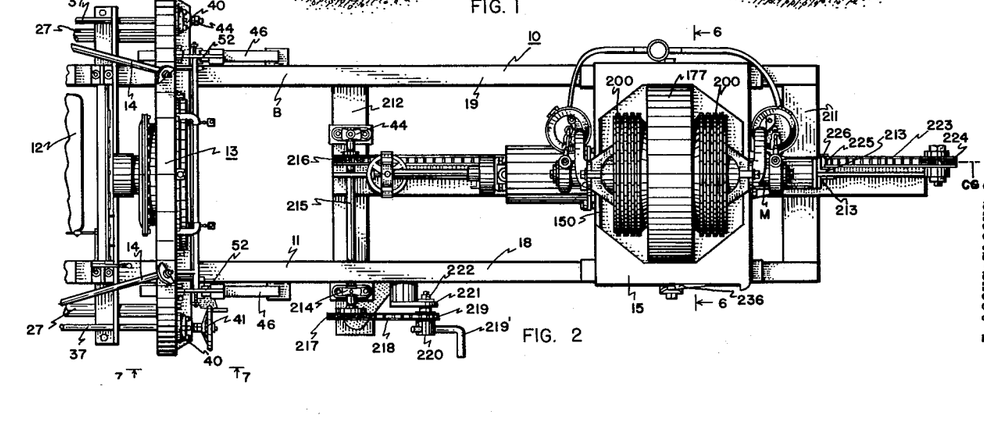
FIGURE 2 is a fragmentary plan of the machine shown in FIGURE 1 minus the transmission to be tested.
Figures 3, 4, 4A, 5, 6, 6A, 7, 8A:
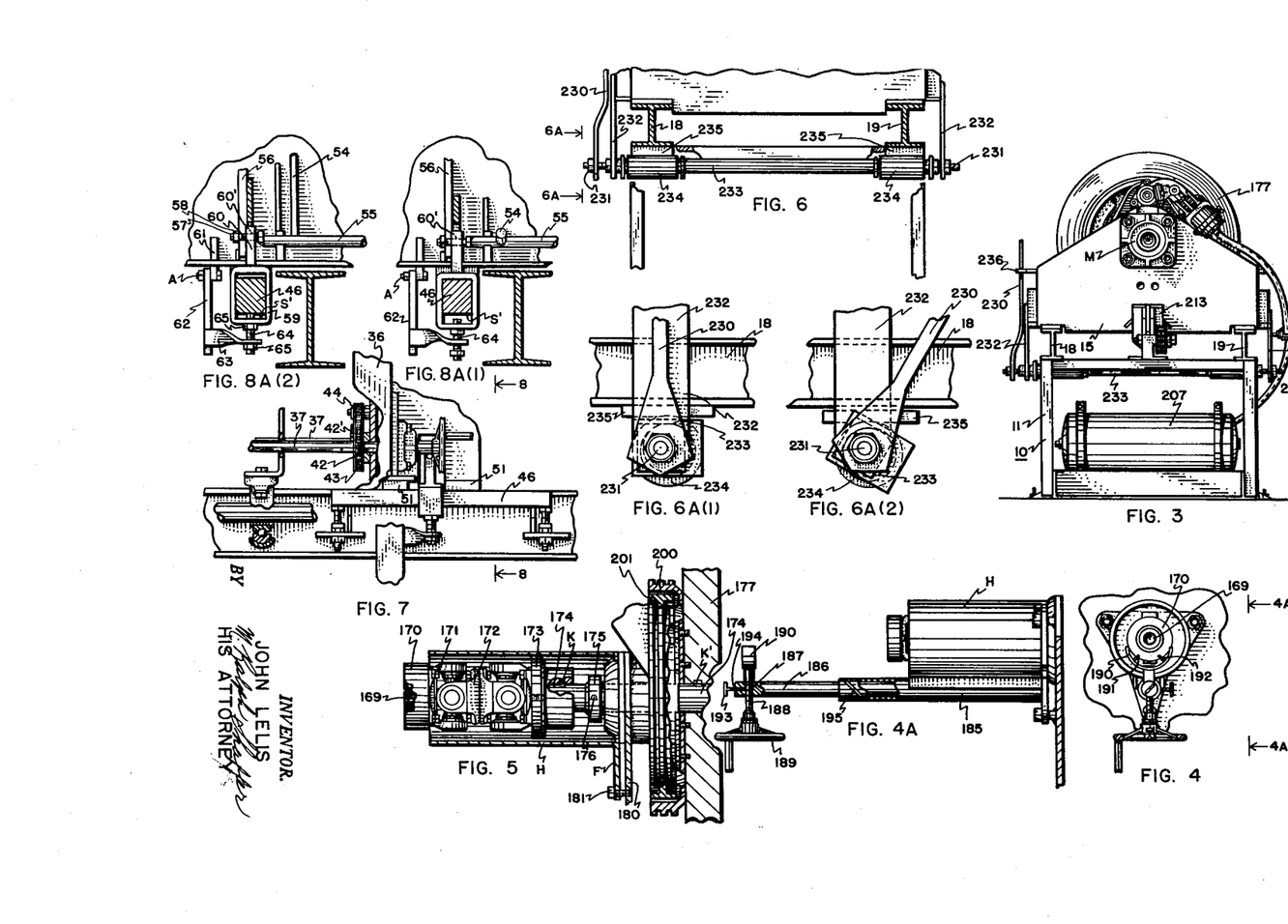
FIGURE 3 is an end elevation taken along the line 3—3 in FIGURE 1.
FIGURE 4 is an enlarged, fragmentary view taken along the line 4—4 in FIGURE 1 and illustrates (only) the receiving mechanism for the output shaft of the transmission to be tested.
FIGURE 4A is a view taken along the line 4A—4A in FIGURE 4 and illustrates the side elevation of the aforementioned, receiving mechanism.
FIGURE 5 is a fragmentary, cut-away plan taken along the line 5—5 in FIGURE 1 and illustrates the mechanism associated with the fly wheel of the machine.
FIGURE 6 is a fragmentary section taken along the line 6—6 in FIGURE 2 and illustrates (only) the eccentric lock mechanism of the tail stock of the machine.
FIGURE 7 is an enlarged fragmentary view taken along the line 7—7 in FIGURE 2 and illustrates the driving mechanism associated with the adjustable, mounting blade of the machine.

In FIGURES 1–3 the testing stand 10 is shown to include a frame 11, a power plant 12 fixedly mounted thereto in any conventional manner as by bolts or welding, an adjustable "blade" 13 having associated structure 14, a tail stock 15, and other structure as shall be hereinafter explained. Frame 11 is secured to the concrete floor of the machine shop by means of studs 16 embedded in the cement thereof and nuts 17. Frame 11 includes a pair of horizontal I-beams 18 and 19 to which the power plant 12 is fixedly mounted. The power plant 12 will of course be mounted upon the two I-beams 18 and 19 so that the drive shaft 12' of the power plant will be parallel to these I-beams, above the same, and with the vertical projection thereof following centrally of the two I-beams. Power plant 12 is provided with hand throttle 20 and also foot throttle 21, the latter being connected to the power plant by means of linkage 22, of common design. Brackets 23 are fixedly disposed with respect to power plant 12 and provided mountings for self-aligning, ball-and-socket journal bearings 24 which are brought into alignment by means of shims S and are bolted to the brackets 23 by means of bolts 25 and nuts 26. Two of the self-aligning bearings 24 will be found on each of the two sides of the machine, and the respected pairs journal slide rods 27 (two in number). The slide rods 27 are thus adapted for movement in longitudinal directions within the self-aligning journal bearings 24 within which they are enclosed. Each of the two slide rods 27 forms a necessary part of the structure 14 associated with adjustable blade 13. Other components of this rigid structure 14 (on each side of the power plant) are angle irons 28 and 29, brackets 30, 31 and 32, post 33, collar 34 (rigidly affixed to slide rods 27), brace 35 and base member 36. These are all welded or bolted together as shown. The structure on both sides of the machine is identical. Also disposed on both sides of the equipment is a screw-threaded rod 37 threading into nut 38 of tube 39, the latter being affixed to bracket 23 as shown. Self-aligning bearing 40 is affixed to base member 36 (see FIGURES 8 and 9) and journals the screw threaded rod 37, the latter being provided with wheel crank 41. (Base member 36 simply comprises a web and a peripheral flange, as shown.) It will be noted in FIGURE 2 that there are two self-aligning bearings 40 journalling their respective, screw threaded rods 37. However, there will of course be only one wheel crank 41. Simultaneous and corresponding rotation of both of the rods 37 is accomplished by virtue of a chain drive including drive and driven sprockets 42 and 42' mounted upon their respective rods 37, a connecting chain loop 43, and a spring-loaded idler 44 affixed to base member 36 and cooperating in tightly mounting the latter chain loop 43 so as to couple the two sprockets 42 and 42' and their respective rods 37. See FIGURE 7 in this connection. A nut 44 keeps the rod 37 (to the top of FIGURE 2) from pulling out of its journal at 40.

It should be mentioned at this point that base member 36 of adjustment blade 13 does not slide along the two I-beams 18 and 19. Rather, the weight of base member 36 and its associated structure is carried completely by the self-aligning bearings 24 (two on each side). It is to be noted at this juncture that the nature of these bearing mounts 24 (self-adjusting) prevents the structure from binding on the two slide rods 27. As has been heretofore explained, the slide rods 27 are shimmed and aligned so that they will be parallel to each other and to the axis of the crank shaft of the power plant. It will be noted also that the slide rods 27 are disposed outwardly a good distance from the center line of the power plant crank shaft. This will enable tolerances to be held more closely as center-line is approached than were these rods themselves closer together.

Thus we have without more an adjustment blade 13 which, by virtue of the rotation of wheel crank 41, may be moved either to the right or to the left in FIGURE 1, the weight thereof being carried through the slide rods 27 and self-aligning bearings 24 to the fixed power plant and frame.

Figures 8, 9, 12, 14, 15, 16, 17:
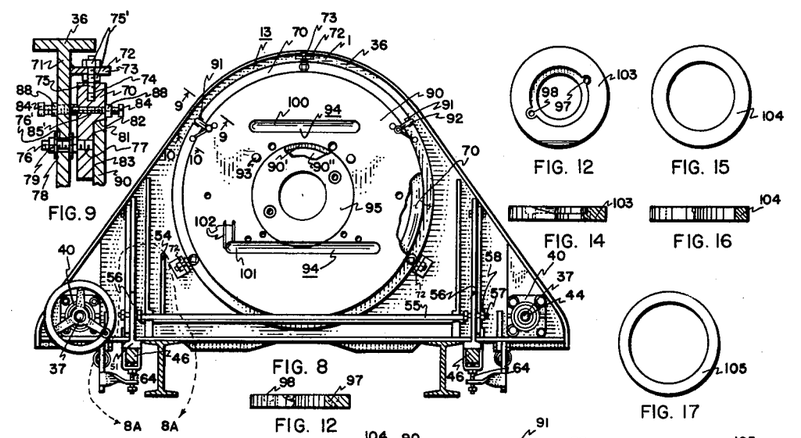

Anti-sag bar means in the form of a pair of solid, hardened steel bars 46 will be noted in FIGURES 1, 2 and 8. Each of these square, solid bars 46 is attached to its respective I-beam (18 or 19) by means of apertured brackets 47 welded to the I-beam and the respective bar mounting nuts 48, nuts 49, and threaded studs 50. Identical mountings mount each of the bars 46 at its two ends to its respective I-beam. The purpose for these steel bars 46 is to keep the base member 36 of adjustment blade 13 from sagging either (1) under the weight of a transmission attached thereto or (2) upon the actuation of the eccentric lock structure (hereinafter to be explained) associated with adjustment blade 13. The steel bars are adjusted on installation as follows: The blade 13 is run out to the right as far as it will go and the installer just "shuts out daylight" between front steel pad 51 (attached to base member 36 of adjustment blade 13 by means of bracket 52), this by adjusting the nuts 49 on the right-hand side at FIGURE 1; then the installer performs the same operation at the left hand side of each of the bars 46, shutting out daylight between rear steel pad 51 and the bar 46. See FIGURE 7.

We now arrive at a juncture to consider the eccentric lock of the adjustable blade 13. Reference is made to FIGURES 8, 8A(1), and 8A(2), wherein it is seen that the lock simply consists of a handle 54 welded to a horizontal and laterally disposed rod 55, the latter being journalled at brackets 56 at the rods' off-center, threaded ends 57. These ends are held in place by means of respective nuts 58. These ends carry at apertures 60' an open, box element 59 and a respective extension member 60, both being raised when handle 54 is up as in FIGURE 8A(2), and the same being lowered (to unlocked position) when the handle is lowered as in FIGURE 8A(1). Brackets 61 are welded to the base member 36 and connect to their respective box members 59 thereto by means of rocking arms 62 (using attachments A) and turned brackets 63 (together with threaded studs 64, which thread into the box members 59, and nut attachments 65). It will be noted that the lower surface S' of each of the bars 46 serves as a means for locking adjustable blade 13 in position. Again, in referring to FIGURE 8, when the handle 54 is up (as is therein shown) the blade is locked securely in place, by virtue of the inter-action of bars 46 and the ends of studs 64. One may loosen this lock by simply pulling downwardly on bar 54 in a quarter-circle (see FIGURE 8A(1)) so as to release the engagement of the ends of studs 64 with the bottom surfaces S' of each of the bars 46. Again, it is important to note in connection with the two pads 51 (see FIGURE 7) that the locking of the eccentric will not interfere with the alignment of equipment, this by virtue of their cooperation with the upper surface of each of the steel bars 46.

Also a part of adjustable blade 13 is a hardened steel ring 70 (see FIGURE 8) which is held in position with respect to the web 71 of base member 36 by means of attachments which are now to be described. The web 71 has a series of three, outwardly extending, slotted bracket flanges 72 each having an attachment slot 73. The steel ring 70 is provided with radial, threaded bores 74 at three places (spaced 120° apart), and threaded studs 75 are bottomed in these bores and are provided with lock nuts 75' (two in number) disposed on both sides of each flange 72. These attachments should be loose until threaded studs 76 are threaded into the longitudinal bores 77 (again at three places) of steel ring 70 and the studs 76 (passing through apertures 76', enlarged for alignment purposes) are secured to the web 71 of base member 36 by means of washers 78 and nuts 79. Now it will be seen in FIGURE 9 that the steel ring 70 is provided with an undercut area 81 having a ring shoulder 82 and a flat surface 83. The procedure is to attach a dial indicator to the drive shaft of the power plant and then sweep the ring shoulder 82 and surface 83, alternately, until error in exact alignment is less than four thousandths of an inch. At this juncture the tightening of the attachments associated with the radial and longitudinal threaded bores 75' and 77 will be completed. The final bringing into alignment of equipment is accomplished by adjusting the oppositely facing bolts 84, three pairs of these being spaced 120° apart; these latter are threaded through threaded bores 85 of the steel ring 70 and 85' of web 71 and respectively abut the surface of web 71 or the adjacent surface of the steel ring 70, as shown. Final alignment of the steel ring 70 is accomplished, thus, by stress loading the ring by means of tightening the bolts 84. Once the steel ring is brought into alignment with the crankshaft of the power plant, the lock nuts 88 are tightened down and the alignment of the equipment should be complete and undisturbed by the further loading of the steel ring (such as by mounting an automatic transmission to be tested onto the blade 13).

As is seen in FIGURE 9, the recessed area 81 of steel ring 70 may have a shoulder at 82 which is either straight (90°) or slightly tapered outwardly so that the several adapter plates (when tapered as 90) may be conveniently inserted therewithin. The steel ring 70 is notched at 91, in two or more places, and thus accommodates steel C-clamps 92. See FIGURE 10 in this regard. The C-clamps enable rapid insertion and removal of adapter plates into and out of steel ring 70. The clearance between adapter plate 90 and the steel ring 70 is only the order of one-thousandth of an inch. Hence, by virtue of the notches 91 sufficient pressure can be exerted upon the two C-clamps 92 so that, by virtue of retentive friction, there will be no danger of adapter plate 90 slipping around within its seat when the machine is in operation. It will be seen in connection with FIGURES 8 and 11 that the adapter plate 90 includes a series of sets of dowel pin and transmission stud receiving holes 93, pan relief indentations 94, and is provided with a centering ring 95 on recessed lip 90' about rotor access aperture 90''. Transmissions are secured to their respective adapter plates by the transmission studs passing through selected ones of the holes 93 and by nuts threaded onto these studs. Jetaway transmissions may require threaded holes in their adapter plate and separate mounting bolts.

The centering ring 95 in FIGURES 8 and 12 may be replaced by any of the centering rings illustrated in FIGURES 13 through 18, depending upon the type and model of automobile transmission being tested. These centering rings fit the head end contour of the automatic transmission housings for which they are intended. Tolerances are held to one-thousandth of an inch or less. These rings are not fastened to adapter plate 70 but merely fit into the seat defined by recessed step 90'. Apertures 97 and 98 in the rings 95 and 103 are for transmission stud relief only.

Again, it is the adapter plate 90, together with any one of the centering rings illustrated in FIGURES 12 through 18, which operates to mount the housing of the transmission securely so that the driven shaft thereof may pass through the aperture of the adapter ring for coupling to the drive shaft of the power plant. A depression 100 in adapter plate 90 of FIGURE 8 represents an adaption for "Borg-Warner" transmissions. Depressions 101 and 102 are "Ford-O-Matic" pan adaptions. The ring 95 shown inserted in adapter plate 90 renders the equipment suitable for testing transmissions of the hydromatic type (1946 to 1951). When ring 103 is inserted into the recessed area 104 of adapter plate 90, the equipment is suitable for testing hydromatic transmissions (1952 to 1956). With ring 104 shown in FIGURES 15 and 16, the adapter plate 90 of FIGURE 1 may mount the housing of "Ford-O-Matic" transmissions, 1951 to 1958. And with the ring 105 illustrated in FIGURES 17 and 18, the equipment is suitable for testing "Power-Flight" and "Torque-Flight" transmissions, 1953 to 1960. It is only the adapter plate 90 illustrated in FIGURE 8 which takes any of the centering rings shown in FIGURES 12–18.

Figures 10, 11, 18, 19, 20, 21, 22, 23, 24, 25, 26, 28, 29:
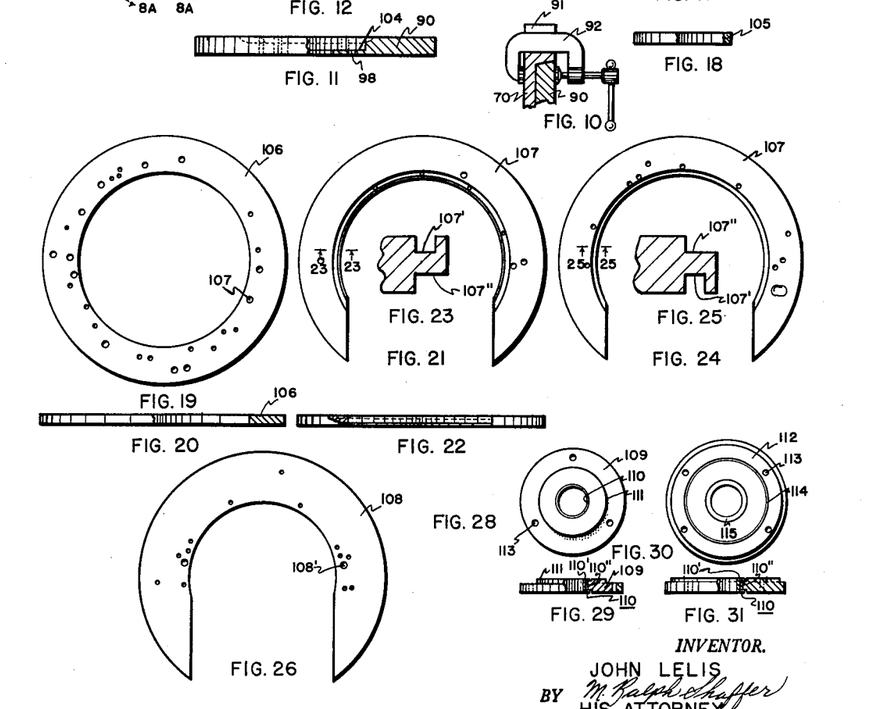
Figure 27:
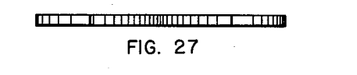
FIGURE 27 is an edge view of the adapter plate shown in FIGURE 26.

Adapter plate 106 in FIGURES 19 and 20 is provided with a plurality of holes 107 (threaded and unthreaded) for taking bolts or dowel pins so as to accommodate the mounting of transmission housings of "Buick Dynaflow" transmissions, 1948 to 1958, and "Cadillac" "Jetaway" transmissions, 1956 to 1960. FIGURE 21 illustrates one side of adapter plate 107 whereas FIGURE 24 illustrates the remaining side thereof. The FIGURE 21 side of adapter plate 107 accommodates the "Packard Ultramatic" transmissions 1950 to 1956. The FIGURE 24 side of adapter plate 107 takes the "Power Glide" transmissions, 1950 to 1960. This adapter plate could be a complete circle, if desired. The undercut ring 107' and undercut edge 107'' are illustrated in sectional views shown in FIGURES 23 and 25. Adapter plate 108 in FIGURES 26 and 27 includes a plurality of dowel pins or bolt apertures 108' and is adapted for mounting transmission housings of the "Jetaway" type, 1956 to 1960, and also "Cadillac" and "Oldsmobile" "Dynaflow" transmissions, 1953 only.

FIGURES 28 and 29 illustrate a seal cap 109 which is in the form of a disc having an appropriate insert 110 (consisting of a metallic, U-configured ring 110' and a rubber backing ring 110'') and a contour step 111. This seal cap is for sealing the aft end of the "Power Glide" transmissions, 1950 to 1960. The seal cap illustrated in FIGURES 30 and 31 is for sealing the aft end of the "Dynaflow" transmissions, 1948 to 1960. The seal cap 112 in FIGURES 30 and 31 is shown to include a plurality of apertures 113, a neoprene sealing ring 114, and the insert 110.

Thus, the adapter plate shown in mounted condition in FIGURE 8, together with its several adapter rings illustrated in FIGURES 12 through 18, and also the remaining adapter plates illustrated in FIGURES 19 through 27 serve, each in turn, to mount by dowel pins and bolts the stationary housings of the several transmissions. The equipment is thus adapted for various types of housings and for various sizes and kinds of input ends associated with transmissions. Accommodation of the test stand to the various transmissions is made by selecting the appropriate adapter plate (and perhaps centering ring, if required) by securing by means of nuts and dowel pins the transmission housing to its appropriate adapter plate, by chain lifting the transmission in horizontal disposition (see FIGURE 1) to a position so that the selected adapter plate may fall into its seat as shown in FIGURE 9, and subsequently by tightening the clamps 92. By this relatively simple operation the transmission is ready to be tested when the blade 13 is moved either to the right or to the left by the wheel crank 41 so that the input end of the transmission may be connected to the power plant of the equipment.

Figures 1B, 32:
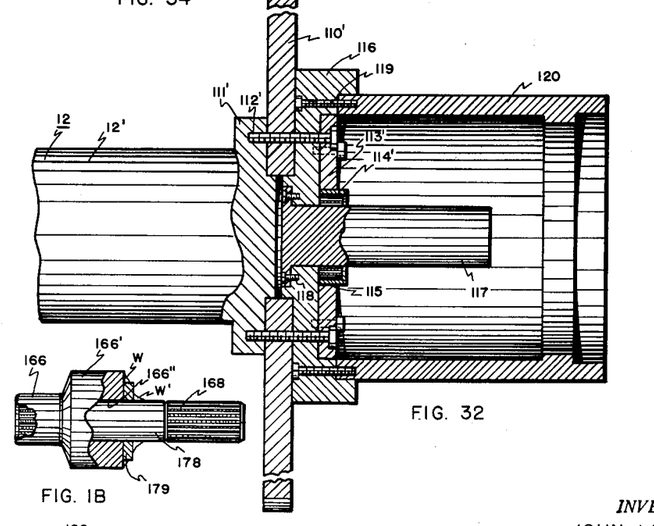
FIGURE 1B is an enlarged, side elevation, partially cut away for purposes of clarity of construction, of an additional adapter for use at the tail stock end of the stand.
FIGURE 32 is an enlarged, side elevation, partially cut away for purposes of clarity, of the work end of the drive shaft of the power plant of the testing stand.

Perhaps it is well now to consider the connection of the transmission to the drive shaft of the power plant. Reference is now made to FIGURE 32 wherein it is seen that the drive shaft 12' of power plant 12 includes a fly wheel 110' which is bolted to a flange 111' thereof by means of bolts 112'. A disc 113' includes a spline seat insert 114' sweated within aperture 115 thereof, a centering ring 116 which is bolted to fly wheel 110' as shown and a flanged centering cylinder 117 bolted by bolts 118 to the member 116. Bolts 119 secure cylinder 120 to member 116 and member 117 provides a centering cylinder or post therefor.

Figures 33, 34, 35, 36, 37, 38, 39:
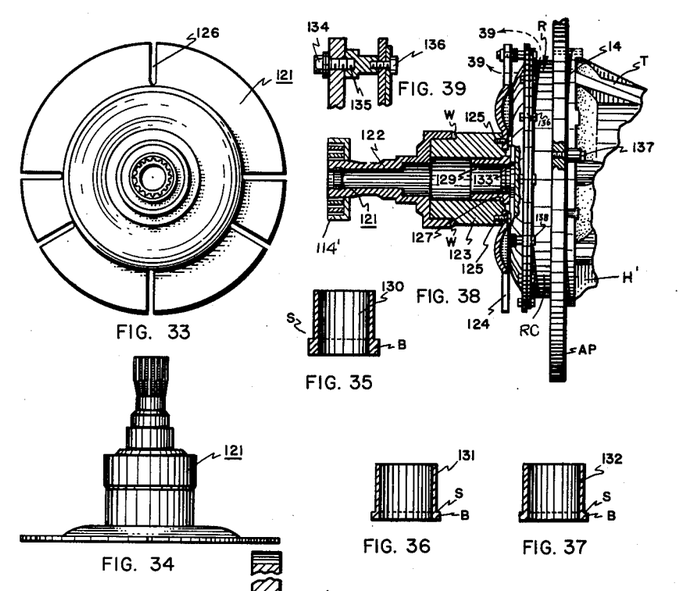
FIGURES 33 and 34 are plan and side elevations, respectively, of the drive plate used as an invention where the transmission to be tested exhibits a bell housing and includes therewithin its fluid unit.
FIGURES 35, 36 and 37 are vertical sections of three centering rings which, alternatively, are used in conjunction with the drive plate of FIGURE 33 to mount the same to the rotor of a "Jetaway" transmission, for example.
FIGURE 38 is a side elevation and illustrates, partially in vertical section, the drive plate shown in FIGURES 33 and 34 and one of the several centering rings mounted to the rotor of a fluid-unit-containing transmission such as the "Jetaway" type.
FIGURE 39 is an enlarged detail in fragmentary section taken along the line 39—39 in FIGURE 38 and shows the attachment of the drive plate to the rotor of the transmission.

There is now to be considered the manner in which the rotor of the transmission to be tested is coupled to the drive shaft end of the drive shaft or drive line 12 (shown in FIGURE 32) for the Jetaway type of transmission as shown in FIGURE 38, where the same has its own bell housing H' and fluid converter RC of rotor R. For this type of transmission the drive plate 121 illustrated in FIGURES 33, 34, 38 and 39 is employed. This drive plate 121 includes a spline member 122 releasably engaged with spline seat 114', a body 123 welded thereto at W and a plate flange 124 which is attached to body 123 by means of bolts 125 and including a series of spaced slots 126. It will be noted in FIGURE 33 that the slots 126 present both a square pattern and also a triangular pattern. This is for the purpose of accommodating various types of transmission rotors where the representative bolt patterns fall either in a square or in a triangle. It will be noted in FIGURE 38 that the body 123 is hollow and has a shoulder or seat 127. This shoulder is found, as is seen, at the base of the body 123. The purpose of shoulder 127 is to seat one of a plurality of new centering rings. These several centering rings are illustrated in FIGURES 38, 35, 36 and 37 and are designated 129, 130, 131 and 132. These centering rings are all of the same general configuration, but differ merely in the length at base B by virtue of the positioning of shoulder S, so as to accommodate various sizes and types of these converter-containing transmissions. The interior diameter of the several centering rings may also vary in size to accommodate the various centering buttons 133 which are fixedly mounted to the respective centers of the rotors of this type of transmission.

The procedure in attaching the drive plate 121 to the rotor R at converter RC of this type of transmission is to select the appropriate centering ring (illustrated in FIGURES 35-38), insert the same in the base of the drive plate 121, fit the drive plate against the converter RC of rotor R of the transmission T, and then insert bolts 134 into nuts 135, previously secured to the threaded ends of flange bolts 136 of the transmission rotor at converter RC. This is illustrated in FIGURE 39. The elongated nature of slots 126 enables the centering of the drive plate by virtue of the particular centering ring employed. Thus, the rotor and fluid converter thereof of the transmission remain intact, and the flanges 136 therof do not need to be unbolted to accomplish the testing of the transmission. The bell housing H' of transmission T is secured to the appropriate (see FIGURES 19-27) adapter plate AP (fitted within the steel ring of the blade mechanism) by a series of bolts 137, and converter RC of rotor R, if of a type protruding past its bell-housing H' as shown in FIGURE 38, passes centrally through the blade at adapter plate AP for the previously mentioned connection to drive plate 121. Dowel pins 138 may be used at other junctures of the transmission housing H with the adapter plate AP.

Figures 40, 41, 42:
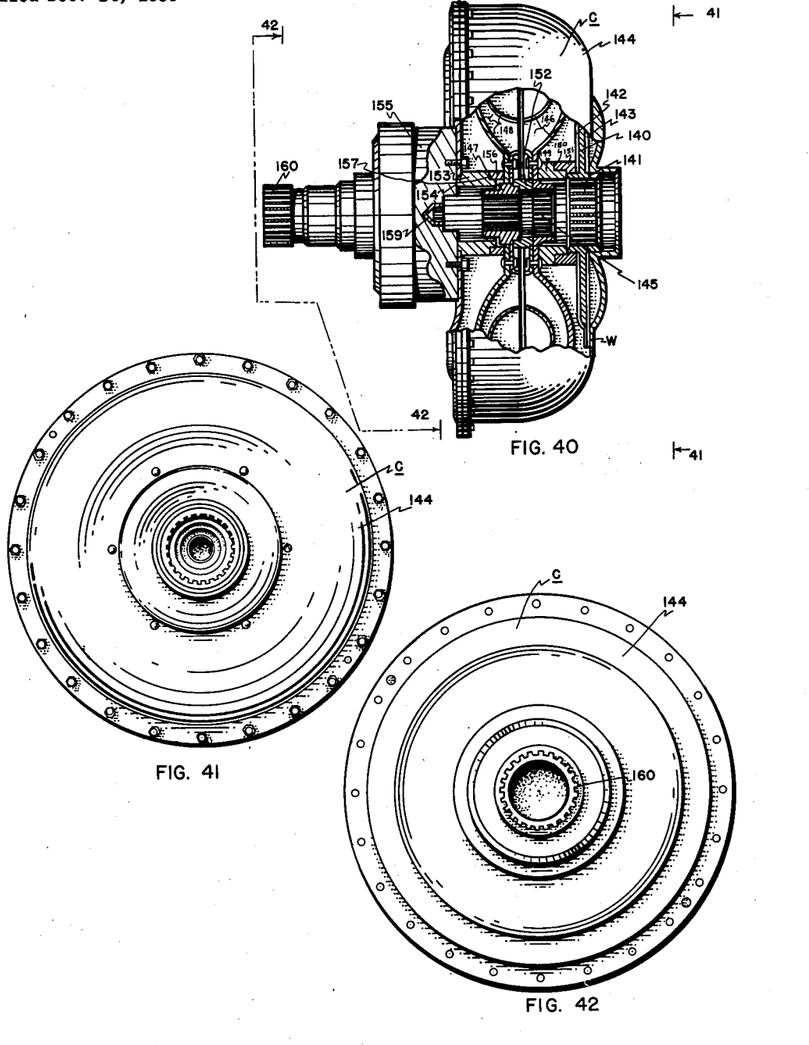
FIGURE 40 is a side elevation, partially cut away for purposes of clarity, of a selected, reworked, conventional fluid converter which is used to couple various types of transmissions to the drive shaft of the power plant of the stand.
FIGURE 41 is a front elevation taken along the line 41—41 in FIGURE 40 of the reworked converter.
FIGURE 42 is a view taken along the line 42—42 in FIGURE 40 and illustrates the rear elevation of the reworked converter.

For transmissions such as those of the hydromatic type which have separate fluid converters and no bell-housing, a converter adapter as illustrated in FIGURES 40, 41 and 42, may be employed in place of drive plate 121 in FIGURE 33 to couple the hydromatic transmission to the drive shaft of the power plant illustrated in FIGURE 32. This converter is designated C.

The converter illustrated in FIGURES 40, 41 and 42 is identical to standard fluid converters for automatic transmissions save for the following exceptions: plate 140, integral with spline socket 141, is welded to backing plates 142 and 143. (In conventional fluid converters there is a spring action between these three plates so as to render the spline socket 141 self adjusting. This self-adjusting feature may be "killed" by leaving the springs intact (not shown) and by spot welding the three plates together.) The plates 140, 141 and 143 are welded (see W) to housing 144 so that when the splined shaft of the transmission is inserted therewithin to engage spline socket 141, the housing 144 will rotate in accordance with the rotation of the transmission shaft. Spline socket 145 is rigidly affixed as shown to converter blade 146, whereas spline socket 147 is secured as shown to converter blade 148. Steel ring 149 has a recess at 150, is welded to the spline socket member 145, and seats bronze bushing 151, and the latter abuts spline socket 141. A notched bronze bushing 152 engages spline sockets 145 and 147 as shown. Steel ring 153 is welded at 154 to converter body 155, and bronze bushing 156 cooperates with a recess 157 of the former and is welded to the blade unit 148 associated with spline socket 147. A bronze tip 159 serves to journal the point of the transmission input shaft. Splined shaft 160 of the converter is, of course, adapted to be received by splined socket 114' in the power plant drive shaft 12'. See FIGURE 32.

Again, the fluid converter illustrated in FIGURES 40, 41 and 42 is identical to existing converters, excepting for the inclusion in the present converter of the bronze bushings and non-floating feature of spline socket 141. By virtue of this non-floating feature, the input shaft of the transmission will be held in line with the axis of the drive shaft of 12' (in FIGURE 32) with which it will be associated. It has been found that at the present time two or three converter adapters are necessary to couple existing transmissions with the drive shaft. These converter adapters may vary somewhat in spline dimension, for example, but are otherwise identical in construction to that shown in FIGURE 40.

It is to be mentioned at this juncture that the apertures shown in the several adapter plates illustrated are in part provided with threads and in the remainder simply comprise dowel pin holes. It is essential that for proper retention of the transmissions that at least two or three bolts be employed to keep the transmission from moving axially when it is mounted to the adapter plate. Since additional strength may be required, dowel pins may be employed and inserted through the housing mounting apertures and the dowel pin holes on the adapter plate so as to secure the same appropriately.

Figure 1C:
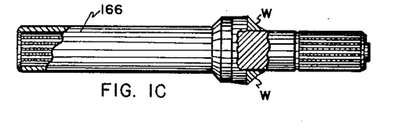
FIGURE 1C is an enlarged, side elevation of yet another adapter which may be used at the tail stock, for transmission mounting.

We now arrive at the point of considering the manner in which the output shaft of the transmission T is coupled to the equipment. In this regard, reference is made to FIGURES 1, 1A, 1B and 1C. See particularly the area 1A in FIGURE 1. The splined output shaft 165 of automatic transmission T fits into spline socket 166 of mounting adapter 167. In addition to spline socket 166, the mounting adapter includes a splined shaft 168 which fits into spline socket 169 (see FIGURE 5) of cylinder 170. This cylinder 170 is mounted by bolts 171 to a double U-joint 172 which in turn is bolted to retainer 173, the latter being keyed (indicated by K) to fly wheel shaft 174 of the machine. Retainer collar 175 is secured by set screw 176 (or by other means) to shaft 174. Fly wheel 177 is rigidly secured to the shaft 174, as is generally indicated at K', either by means of a spline connection, Woodruff keys, sweated joint, or by any other suitable means. Turning back for a moment to a consideration of the mounting adapter (shown in FIGURE 1A) which joins the output shaft of the transmission to cylinder 170 in FIGURE 5, the construction of representative adapters which may be utilized for this purpose are illustrated in FIGURES 1B and 1C. The socket 166 includes a flared end 166' which has a bore 166", the latter being suited for the reception of adapter shaft 178, splined at 168. A washer 179 is fitted over spline shaft 178 to abut against element 166, and the combination is ring welded at W and W'. The adapters of FIGURES 1A, 1B and 1C are all similar in construction and differ only in dimension and size of the spline socket 166. The washer 179 may be deleted as shown in FIGURE 1C. In all events, the construction illustrated for the mounting adapter acts as a safety feature, since excessive torque loads will merely operate to break the weld between the splined shaft and the spline socket of the adapter unit. Thereafter, the mounting adapter unit may simply be re-welded together.

It will be noted in connection with FIGURE 5 that the universal joint and associated mechanism is included within a housing H. This housing H is secured by flange F to member 180 by means of bolts 181. This member 180 is an integral part of tail stock 182 which is deposed upon (and slides upon) the I-beams 18 and 19 in FIGURE 2. It will be noted in connection with FIGURES 1, 4 and 4A (and also FIGURE 5) that integrally related with the housing H is a tube 185 which telescopically receives rod 186. This rod includes a vertical bore 187 which is threaded and receives threaded screw 188 to which wheel crank 189 is attached. The upper end of screw 188 is provided with a semi-cylindrical support 190 having rest flanges 191 and 192. Set screw 193 is supplied the end of rod 186 and threads into bore 194 to engage and thereby position screw 188. The purpose of this mechanism is to support the aft end of the transmission as illustrated in FIGURE 1. This support takes some of the stress loading away from the adapter plate and blade mechanism. The telescopic arrangement above described is secured in place by means of thumb screw 195.

Returning again to consider FIGURE 5 in conjunction with FIGURE 2 it will be seen that the fly wheel 177 has bolted to it on both sides thereof a pair of brake drums 200 with which brake shoes 201 cooperate. It is here mentioned that the braking system associated with fly wheel 177 is of the air-brake type, is strictly conventional in construction, and includes brake pedal 205, motor 206, air compressor 207 and a series of regulator and gauges (not delineated). The (air brake system is the same as may be found on any truck or bus-type vehicle). Tail stock frame 205 has journalled within it by conventional means M the shaft 174 in FIGURE 5 and includes the rotatable fly wheel 177 fixedly mounted on the shaft 174 as heretofore explained. An inverted T-beam 210 is welded to cross braces 211 and 212 and is disposed centrally thereof as shown so as to be in vertical alignment with the crankshaft of the power plant 12 and also with fly wheel shaft 174. Tail stock 15 includes a pair of spaced, back-to-back angles 213 on each (the forward and rear) end thereof, which angles depend downwardly so as to engage therebetween in slideable manner the T-beam 210 as shown. Thus, the vertical web 210′ of the T-beam 210 serves as a guide for the tail-stock assembly. Self-aligning bearings 214 are mounted to the frame 11 of the machine as shown and journal shaft 215, the latter being provided with a pair of sprockets 216 and 217. Sprocket 217 is connected by drive chain 218 to drive sprocket 219 associated with a crank 219′, the latter seated in an eyebolt type shaft 220 which is affixed to bracket 221 by means of attachments 222. Bracket 221 is welded or otherwise rigidly affixed to frame 11. The vertical web of T-beam 210 may be provided with a relief area (not shown) for admitting the shaft 215 to journal within bearings 214. Chain 223 engages sprockets 216 and 224 and is connected at its ends to tail stock 15 at angles 213 (front and rear) by means of a respective pin 225 and welded bracket 226. This attachment is identical at both the front and aft ends of tail stock 15. An important feature of the invention is that the points of attachment of chain 223 to the tail stock 15 be at the latter's, horizontal and longitudinal, center of gravity axis, or at least closely adjacent thereto. See axis CG in FIGURE 2. Thus, the operator turns crank 219 and, with the points of attachment of the chain lying along the center of gravity of the tail stock, and further, with the appropriate sizing of the sprocket, the translation of the tail stock is made easy, notwithstanding the weight of the tail stock which may be of the order of 1100–1500 lbs. No weight, however, is carried by the central web of the T-beam. Rather, this weight is carried by steel pads P of the tail stock, these slidably resting upon and being supported by the upper surfaces of I-beams 18 and 19, i.e. bed B.

FIGURES 1, 2, 3, 6, 6A(1) and 6A(2) illustrate the eccentric lock of the tail stock. The slightly springy, locking bar handle 230 is pivoted by an eccentric connection 231 to braces 232, the eccentric connection being welded in an off-center manner to shaft 233. This connection is identical at both ends of the eccentric lock as is shown in FIGURE 6. The shaft 233 is disposed within and carries cylinders 234 to which latter are welded braking pads 235. The braking pads selectively cooperate with the undersurfaces of I-beams 18 and 19. Thus, and as is illustrated in FIGURE 6A(1), when arm 230 is vertical (or close to the vertical) the eccentric shaft 233 comes up against cylinders 234 so as to force braking pads 235 against the lower surfaces of I-beams 18 and 19. When, however, the brake is released, as illustrated in FIGURE 6A(2) with the handle disposed to the right, then the eccentric shaft 233 and cylinders 234 are disposed downwardly; hence, the braking pads 235 welded to cylinders 234 are dropped away from the I-beams. The arm 230 is maintained in locked position by virtue of a dog triangle 236 which is welded to the framework of the tail stock 15.

The operation of the equipment thus becomes clear. After the initial alignment of the equipment as heretofore explained, the operator merely selects the appropriate adapter plate and adapter ring (if used), also the appropriate adapter connection for the rear of drive end of the transmission, inserts the same in their respective mountings by use of the C-clamps, et cetera, inserts one of the adapters illustrated in FIGURES 1, 1B or 1C into cylinder 170 as shown in FIGURES 1 and 5, selects and installs either the appropriate fluid converter adapter (see FIGURE 40) by intercoupling by the same the power plant drive shaft 12′ with the input shaft of the transmission (or, alternatively, installs the drive plate as shown in FIGURE 38), positions and locks the blade assembly and tail stock assembly in place by use of their respective eccentric locks, and then the equipment is for use. Easy substitution of transmissions is accomplished in the above manner reversed and merely by re-selecting an appropriate adapter plate and adapter ring, attaching the same to the transmission, intercoupling the transmission with the power plant either by a fluid converter of FIGURE 40 or by the drive plate illustrated in FIGURE 33, by repositioning the blade appropriately so that a tight linkage exists between the power plant and the transmission, cranking the tail stock by means of crank 219 in FIGURE 2 to the appropriate position (after selecting and inserting in place the tail end adapter), locking the tail stock in place, and turning on the equipment.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A testing stand for testing machines having housings and rotors of differing character, including, in combination: a frame exhibiting a horizontal bed, a power plant affixed to said bed and disposed on one side of said frame, said power plant exhibiting an output drive shaft; selected means releasably connected to said drive shaft for coupling said drive shaft to the rotor of the particular machine to be tested; a tail stock slideably disposed on said bed and facing said power plant on the remaining side of said frame; means affixed to said tail stock and said frame for translating said tail stock back-and-forth along said bed; means affixed to said tail stock for locking said tail stock in a selected position upon said bed; blade means disposed between said power plant and said tail stock for mounting the housing of the machine to be tested coaxially with said power plant drive shaft, said blade means exhibiting a rotor access; communicating aperture in registry with said power plant drive shaft; means affixed to said frame and mounting said blade means to said frame for translational movement in-between said power plant and said tail stock; means coupled to said blade means and also to said frame for translating said blade means back-and-forth, in-between said power plant and said tail stock; and means affixed to said blade means for locking said blade means to said frame in a selected position.

2. Apparatus according to claim 1 wherein said blade means includes as part of its structure a pair of horizontal slide rods disposed on opposite sides of said power plant and parallel to said drive shaft and means rigidly securing said slide rods to the remainder of said blade means, and wherein said means mounting said blade means to said frame comprises two pairs of self-aligning journal bearings rigidly mounted to said frame on opposite sides of said power plant and respectively journalling said slide rods for slideable, horizontal, translational movement therewithin.

3. Apparatus according to claim 1 wherein said blade means includes as part of its structure a pair of horizontal slide rods disposed on opposite sides of said power plant and triangularly parallel to said drive shaft and to each other and means rigidly securing said slide rods to the remainder of said blade means, and wherein said means mounting said blade means to said frame comprises two pairs of self-aligning journal bearings rigidly mounted to said frame on opposite sides of said power plant and respectively journalling said slide rods for slideable, horizontal, translational movement therewithin.

4. Apparatus according to claim 1 wherein said frame includes: anti-sag bar means disposed underneath and just touching said blade means for supporting said blade means in alignment despite the imposition of blade-sag producing forces, said frame also including means for mounting said bar means and means engaging said bar means and said bar mounting means for adjusting the level and height of said bar means.

5. Apparatus according to claim 1 wherein said means for locking said blade means comprises manually actuatable, eccentric locking means selectively and frictionally engageable with said frame.

6. Apparatus according to claim 1 wherein said means coupled to said blade means and also to said frame, for translating said blade means in-between said power plant and said tail stock, comprises a pair of parallel, screw-threaded rods, self-aligning bearing means affixed to said blade means and journalling said rods, fixed means fixedly disposed with respect to said frame on opposite sides of said power plant and cooperating with said screw-threaded rods in translating the latter upon the rotation of the latter, manually actuatable means for rotating one of said screw-threaded rods connected thereto, and means coupling said screw-threaded rods for mutual, synchronous movement.

7. Apparatus according to claim 1 wherein said blade means includes: an upstanding base member translationally mounted to said means affixed to said frame and exhibiting a rotor access aperture, an adapter plate mounting ring exhibiting an interior step recess, adjustable means affixed to said upstanding base member and engaging said ring for aligning the step recess of said ring to the said power plant drive shaft so that the former is coaxial, normal, and surface-squared with the latter, an adapter plate, having a plurality of transmission mounting apertures and a rotor access aperture, disposed in said ring within said step recess, and means engaging said ring and said adapter plate for securing these members together.

8. Apparatus according to claim 1 wherein said blade means includes: an upstanding base member translationally mounted to said means affixed to said frame and exhibiting a rotor access aperture, an adapter plate mounting ring exhibiting an interior step recess, adjustable means affixed to said upstanding base member and engaging said ring for aligning the step recess of said ring to the said power plant drive shaft so that the former is coaxial, normal, and surface-squared with the latter, an adapter plate, having a plurality of transmission mounting apertures and a rotor access aperture, disposed in said ring within said step recess, said adapter plate exhibiting a step recess about said rotor access aperture, a centering ring snugly fitted into said step recess about said rotor access aperture, and means engaging said ring and said adapter plate for securing these members together.

9. Apparatus according to claim 1 wherein said blade means includes: an upstanding base member translationally mounted to said means affixed to said frame and exhibiting a rotor access aperture, an adapter plate mounting ring exhibiting an interior step recess, adjustable means affixed to said upstanding base member and engaging said ring member for aligning the step recess of said ring to the said power plant drive shaft so that the former is coaxial, normal, and surface-squared with the latter, a selected one of a plurality of adapter plates, interchangeable within said step recess of said ring and exhibiting varying, mounting hole patterns, disposed in said ring within said step recess, each of said adapter plates having a plurality of transmission mounting apertures and a rotor access aperture, and means engaging said ring and said selected adapter plate for securing these members together.

10. Apparatus according to claim 1 wherein said tail stock includes a horizontally journalled fly wheel shaft disposed in-line with said power plant drive shaft, a fly wheel keyed to said fly wheel shaft, and actuatable means for selectively braking said fly wheel.

11. Apparatus according to claim 1 wherein said tail stock includes an eccentric lock means for selectively and frictionally engaging said frame, said eccentric lock means including a manually actuatable, pivotable handle, said frame including a triangular dog means retentively engageable with said eccentric lock handle.

12. Apparatus according to claim 4 wherein said means for locking said blade means comprises manually actuatable, eccentric locking means selectively and frictionally engaging said anti-sag bar means of said frame.

13. Apparatus according to claim 7 wherein said ring and adapter plate engaging means comprise C-clamp means.

14. Apparatus according to claim 7 wherein said upstanding base member exhibits a plurality of outwardly extending, slotted flanges receiving said adjustable means affixed to said upstanding base member.

15. Apparatus according to claim 10 wherein said tail stock also includes a spline socket connection member and a universal joint member intercoupling said spline socket connection member with said fly wheel shaft.

16. Apparatus according to claim 13 wherein said ring is peripherally notched to receive tightly said C-clamp means.

17. Apparatus according to claim 15 wherein said tail stock also includes one of a plurality of interchangeable, splined adapters releasably inserted into said spline socket connection, each of said splined adapters having splined receiving sockets of varying sizes to receive various sized output shafts of machines to be tested.

18. Apparatus according to claim 15 wherein said tail stock also includes a splined adapter releasably mounted in said splined connection member and having a spline receiving socket.

19. For an automatic transmission testing machine, blade means having: means for mounting for translational movement the remainder of said blade means to the testing machine, a lateral, vertically oriented ring coupled to said mounting means and adapted to receive one of a selected number of transmission housing mounting adapter plates respectively exhibiting a rotor access aperture and also a plurality of sets of bolt mounting apertures, one set per respective transmission to be mounted thereto, a selected adapter plate fitted into said ring, and means cooperating with said ring and said selected adapter plate for securing said adapter plate in position within said ring.

20. In a transmission testing machine for testing transmissions, said machine including a frame having a horizontal bed, a power plant having a drive shaft, selected means coupled to said drive shaft for coupling said drive shaft to the rotor of the particular transmission to be tested, and a tail stock disposed upon said bed; blade structure disposed between said selected means and said tail stock and comprising an upstanding base member mounted to said frame and having a rotor access aperture, an adapter plate mounting ring having an interior step recess, adjustable means affixed to said upstanding base member and engaging said ring for aligning the step recess of said ring to said selected means so that the former is coaxial, normal, and surface squared with the latter, a selected adapter plate, having a plurality of transmission mounting apertures and a rotor access aperture, disposed in said ring and seated within said step recess, and means engaging said ring and said adapter plate for securing these members together.

21. A transmission testing machine for testing transmissions, having housings and rotors of differing character, said machine including a frame having a horizontal bed, a power plant having a drive shaft, selected means coupled to said drive shaft for coupling said drive shaft to the rotor of the particular transmission to be tested, a tail stock disposed upon said bed, blade means for mounting the housing of a transmission and disposed between said selected means and said tail stock and mounted to said frame over said bed, said blade means being provided with a rotor admittance aperture means of sufficient dimension to accommodate the protrusion through said blade means at said rotor admittance aperture means of all types of transmission rotors, including converters, which extend beyond their housings and means for enabling the distance between said blade means and said selected means to be altered selectively when desired, for accomodating various types of transmissions.

22. In a transmission testing machine for testing transmissions, having respective housings, respective rotors journaled therewithin, and respective output shafts, including those transmissions having self-contained converters as integral parts of their rotors, said machine including a frame having a horizontal bed; a power plant fixedly disposed with respect to said frame and having a drive line; a tail stock disposed upon said bed and adapted to receive the output shaft of a transmission, having a self-contained converter, to be tested; blade means adapted for mounting to the housing of said transmission to be tested and disposed between said drive line and said tail stock; and means for enabling the distance between said blade means and said drive line to be altered selectively when desired, an improvement in combination with the foregoing comprising a drive plate adapter rotatable with said drive line and comprising an axial body keyed to said drive line and a transverse flange, exhibiting opposite surfaces, fixed with respect to said body and having a plurality of radial slots providing access communication between said surfaces and accommodating a plurality of converter bolt patterns of said converter, and bolt means passing through said slots of said flange and adapted to secure said drive plate adapter to said converter of said transmission on center-line therewith.

23. The structure of claim 22 wherein said body includes a keying connection, accommodating keying to said drive line, at one end thereof and a bore at the remaining end, said transmission converter having a centering protuberance, and one of a plurality of centering rings, of various inside diameters but of the same outside diameter, withdrawably inserted into said bore and adapted to fit tightly over said centering protuberance of said converter.

References Cited in the file of this patent
UNITED STATES PATENTS

| | | |
|---|---|---|
| 1,414,970 | Nelson | May 2, 1922 |
| 1,452,905 | Beehler | Apr. 24, 1923 |
| 1,662,705 | Highfield | Mar. 13, 1928 |
| 2,388,425 | Lund | Nov. 6, 1945 |
| 2,918,822 | Mann | Dec. 29, 1959 |